United States Patent
Miller et al.

(10) Patent No.: US 10,412,527 B1
(45) Date of Patent: Sep. 10, 2019

(54) HEAD-RELATED TRANSFER FUNCTION DETERMINATION USING BASE STATIONS

(71) Applicant: Facebook Technologies, LLC, Menlo Park, CA (US)

(72) Inventors: Antonio John Miller, Sammamish, WA (US); Ravish Mehra, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/865,522

(22) Filed: Jan. 9, 2018

(51) Int. Cl.
*H04R 5/02* (2006.01)
*H04S 7/00* (2006.01)
*H04S 3/00* (2006.01)
*H04N 13/204* (2018.01)

(52) U.S. Cl.
CPC .......... *H04S 7/301* (2013.01); *H04N 13/204* (2018.05); *H04R 5/02* (2013.01); *H04S 3/008* (2013.01); *H04S 7/303* (2013.01); *H04S 2400/11* (2013.01); *H04S 2420/01* (2013.01)

(58) Field of Classification Search
CPC .......... H04S 7/301; H04S 3/008; H04S 7/303; H04S 2400/11; H04S 2420/01; H04N 13/204; H04R 5/02
USPC ................................................. 381/303, 306
See application file for complete search history.

(56) References Cited

U.S. PATENT DOCUMENTS

| | | | |
|---|---|---|---|
| 2004/0136538 A1* | 7/2004 | Cohen | H04S 1/005 381/17 |
| 2015/0293655 A1* | 10/2015 | Tan | G06F 3/0486 715/727 |
| 2017/0045941 A1* | 2/2017 | Tokubo | G06F 3/167 |
| 2017/0332186 A1* | 11/2017 | Riggs | G06F 3/012 |
| 2018/0061034 A1* | 3/2018 | Zhao | G06T 7/002 |

* cited by examiner

*Primary Examiner* — Xu Mei
*Assistant Examiner* — Ammar T Hamid
(74) *Attorney, Agent, or Firm* — Fenwick & West LLP (57) ABSTRACT

A system including base stations determines head-related transfer functions (HRTFs) for a user. Each base station is located at a distinct location within a local area and includes a speaker configured to emit a test sound in accordance with calibration instructions. A depth camera assembly determines depth information describing a position of a head-mounted display (HMD) in the local area relative to the locations of the base stations. A microphone is placed in an ear canal of a user wearing the HMD, and generates a respective audio sample from the test sound emitted by the speaker of each base station. A controller determines the relative position of the HMD using the depth information, generates the calibration instructions based on the relative position of the HMD, and determines the HRTFs based on the audio samples.

21 Claims, 5 Drawing Sheets

HEAD-RELATED TRANSFER FUNCTION DETERMINATION USING BASE STATIONS

BACKGROUND

This disclosure relates generally to stereophony and specifically to determining a head-related transfer function (HRTF) using base stations.

A sound perceived at two ears can be different, depending on a direction and a location of a sound source with respect to each ear as well as on the surroundings of a room in which the sound is perceived. Humans can determine a location of the sound source by comparing the sound perceived at each ear. In a "surround sound" system a plurality of speakers reproduce the directional aspects of sound using HRTFs. An HRTF characterizes how an ear receives a sound from a point in space. The HRTF for a particular source location relative to a person is unique to each ear of the person (and is unique to the person) due to the person's anatomy (e.g., ear shape, shoulders, etc.,) that affects the sound as it travels to the person's ears.

Conventionally, HRTFs are determined in a sound dampening chamber for many different source locations (e.g., typically more than a 100 speakers) relative to a person. The determined HRTFs may then be used to generate a "surround sound" experience for the person. But the quality of the surround sound depends heavily on the number of different locations used to generate the HRTFs. Moreover, to reduce error, it is common to determine multiple HRTFs for each speaker location (i.e., each speaker is generating a plurality of discrete sounds). Accordingly, for high quality surround sound it takes a relatively long time (e.g., more than an hour) to determine the HRTFs as there are multiple HRTFs determined for many different speaker locations. Additionally, the infrastructure for measuring HRTFs sufficient for quality surround sound is rather complex (e.g., sound dampening chamber, one or more speaker arrays, etc.). Accordingly, conventional approaches for obtaining HRTFs are inefficient in terms of hardware resources and/or time needed.

SUMMARY

Embodiments relate to a system and a method for obtaining HRTFs using base stations. In one embodiment, a user wears a head-mounted display (HMD) for viewing a virtual reality or an augmented reality. Base stations are located at distinct locations within a local area, and each base station includes a speaker configured to emit a test sound in accordance with calibration instructions. A depth camera assembly determines depth information describing a position of the HMD in the local area relative to the locations of the base stations. A microphone is configured to be placed in an ear canal of the user wearing the HMD. The microphone generates a respective audio sample from the test sound emitted by the speaker of each base station. A controller determines the position of the HMD using the depth information. The controller generates the calibration instructions for the speakers based on the relative position of the HMD. By analyzing the test sound received at the microphone, a unique HRTF associated with a relative position between the sound source and each ear can be obtained. The HRTFs may be determined at different positions of the HMD to obtain a plurality of HRTFs for the various positions. The HRTFs may be determined in a calibration mode prior to the user engaging with a virtual reality or an augmented reality application or the HRTFs may be determined and re-calibrated on-the-fly as the user is participating in a virtual reality or an augmented reality experience.

Some embodiments describe a method for determining an HRTF using a HMD system. Depth information is determined that describes a position of a HMD in a local area relative to one or more base stations. And each base station is located at a distinct location within the local area. The relative position of the HMD is determined using the depth information. Calibration instructions are generated based on the relative position of the HMD, and test sounds are emitted in accordance with the calibration instructions from speakers of the one or more base stations. A microphone (e.g., configured to be placed in an ear canal of a user wearing the HMD) generates respective audio samples from the test sounds emitted by the speakers. A HRTF is determined based on the audio samples.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

An artificial reality system may operate in three modes: a static calibration mode, a dynamic calibration mode, and a presentation mode. In the static calibration mode, HRTF calibration is performed. An HRTF characterizes how an ear (e.g., ear canal) of a user receives a sound from sound sources at particular positions relative to the ear. In the presentation mode, audio content is presented to the user according to the HRTF calibration performed. In the dynamic calibration mode, HRTF calibration may be performed on-the-fly while audio content is presented to the user.

In the static or dynamic calibration modes, a system may perform the HRTF calibration using speakers, a head-mounted display (herein also referred to as an "HMD"), and a microphone for each ear. In a calibration mode, a user wears the HMD displaying images and the microphones capturing sounds on both ears. For example, a calibration system may include base stations to determine HRTFs for a user. Each base station is located at a distinct location within a local area and includes a speaker configured to emit a test sound in accordance with calibration instructions. A depth camera assembly determines depth information describing a position of the HMD in the local area relative to the locations of the base stations. A microphone is placed in one or both ear canals of a user wearing the HMD. The one or more microphones generate a respective audio sample from the test sound emitted by the speaker of each base station. A controller determines the relative position of the HMD using the depth information, generates the calibration instructions based on the relative position of the HMD, and determines the HRTFs based on the audio samples.

Based on the HRTFs obtained, the system may determine an audio characterization configuration. The audio characterization configuration is a function, which the system uses in conjunction with the HMD to synthesize a binaural sound that seems to come from a particular point in space. Accordingly, an audio characterization configuration specific to the user allows the system to provide surround sound to the user. In one embodiment, the HRTFs and the audio characterization configuration are stored once the HRTF calibration is completed, hence the HRTF calibration is generally a one-time calibration. However, a user may perform the HRTF calibration at any time.

In the presentation mode, the system presents content through the speaker and/or the HMD, according to the HRTF calibration performed. In one embodiment, images of the content are presented to the user through the HMD. In addition, surround sounds are provided to the user through one or more speakers, according to the audio characterization configuration. In one embodiment, the system tracks the user movement (e.g., head orientation) through an imaging device and presents the content according to the user movement.

System Environment for Determining HRTFs Using Base Stations

Figure 1:
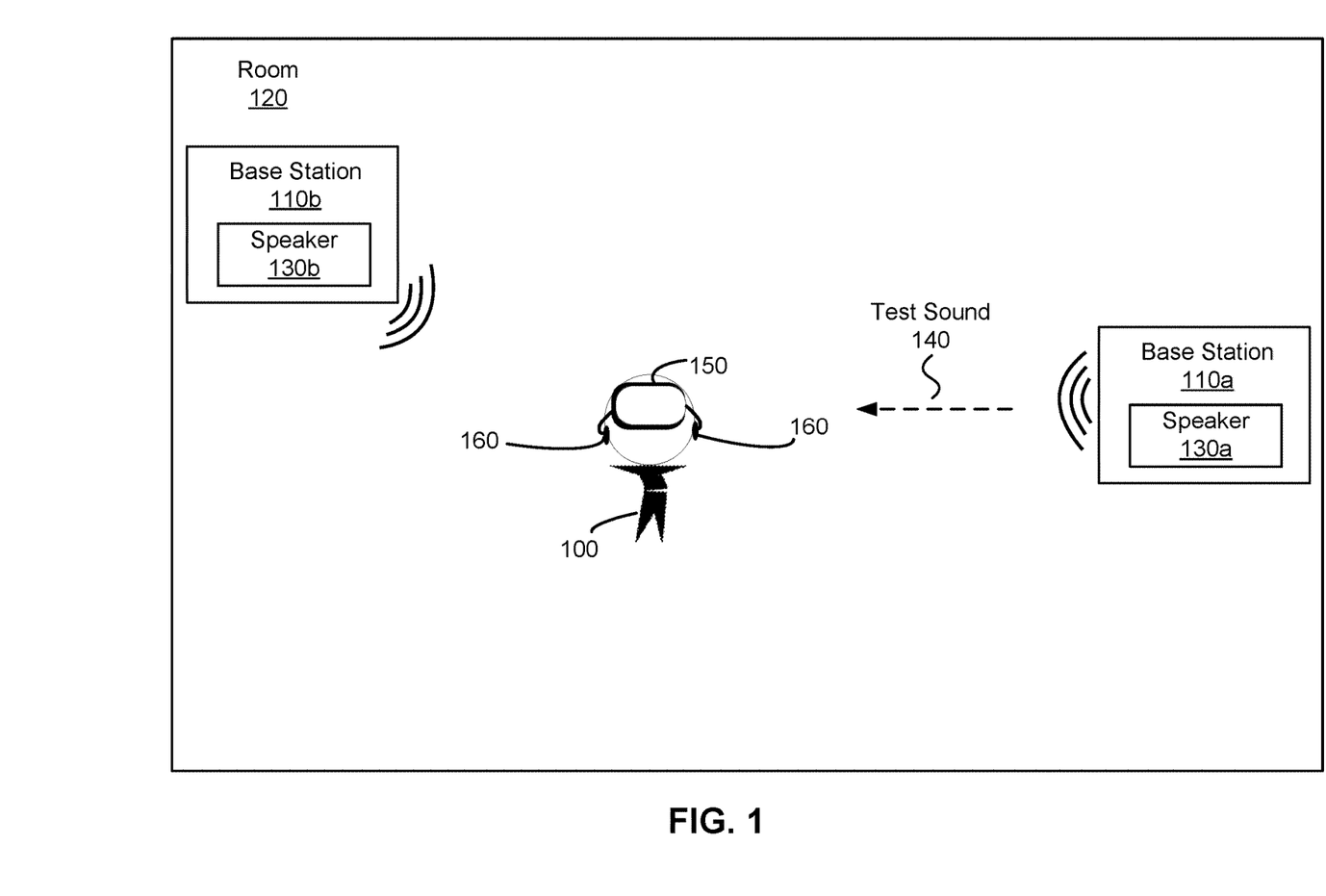
FIG. 1 is an example view of a system environment for determining HRTFs using base stations, in accordance with an embodiment.

FIG. 1 is an example view of a system environment for determining HRTFs for a user 100 using base stations 110a, 110b in accordance with an embodiment. FIG. 1 shows a room 120 in which there are two base stations 110a and 110b. Each base station 110a, 110b has a speaker 130a, 130b to emit a test sound 140 in a direction towards the user 100. Each base station may be an artificial reality console or simply a standalone wireless or wired module communicating with a console and the HMD 150 worn by the user.

Each speaker 130a, 130b is a device configured to transmit sound to the user. The speakers 130a, 130b may be operated according to commands from a controller. In one embodiment, the controller may be part of a console or part of the HMD 150. In one aspect, a speaker (e.g., 130a) is fixed at one position and transmits a test sound 140 that the microphones 160 worn by the user 100 can receive for calibrating HRTFs. The test sounds transmitted by the speakers 130a, 130b for calibration may include, for example, a continuous sinusoidal wave at a constant frequency, a chirp, some other sound wave used for calibrating HRTFs, or some combination thereof. A chirp is a signal whose frequency is swept upward or downward for a period of time. Each speaker 130a, 130b may emit a swept-frequency cosine (chirp) signal with unity amplitude and continuous phase. To specify the desired output chirp signal, a controller may define its instantaneous frequency function, also known as the output frequency sweep. The frequency sweep can be linear, quadratic, logarithmic, some other function used for calibrating HRTFs, or some combination thereof. In another aspect, a speaker 130a, 130b provides sounds that a user can optimally hear based on audio characterization configuration, in accordance with the images presented on the HMD 150.

The HMD 150 may be worn on the user 100's head or as part of a helmet that has a display in front of one eye (monocular HMD) or each eye (binocular HMD). The HMD 150 may also be an optical head-mounted display (OHMD) that reflects projected images and allows the user 100 to see through it. The HMD 150 may display computer-generated imagery (CGI), live imagery from the physical world, or some combination thereof. The HMD 150 may allow CGI to be superimposed on a real-world view (referred to as augmented reality or mixed reality).

The microphone 160 is one or more devices configured to receive sound transmitted by the speakers 130a, 130b, and to convert the received sound into an electronic format (analog or digital). In one aspect, the microphone 160 receives a test sound 140 transmitted from the speakers 130a, 130b, and converts the received test sound 140 into an audio sample. An audio sample herein refers to an electronic representation (either in an analog format, digital format, or some combination thereof) of the received test sound 140. The microphone 160 may provide the audio samples to a console. In one embodiment, two microphones 160 are provided, where each microphone 160 is coupled to a respective ear canal of the user 100. Preferably, a microphone 160 can be attached next to an ear canal, such that a unique HRTF can be obtained to represent how sounds arrive at the ear canal. In one aspect, the two microphones 160 are coupled to the HMD 150. Alternatively, the two microphones 160 are separated from the HMD 150.

System Environment for Determining HRTFs Using Base Stations

Figure 2:
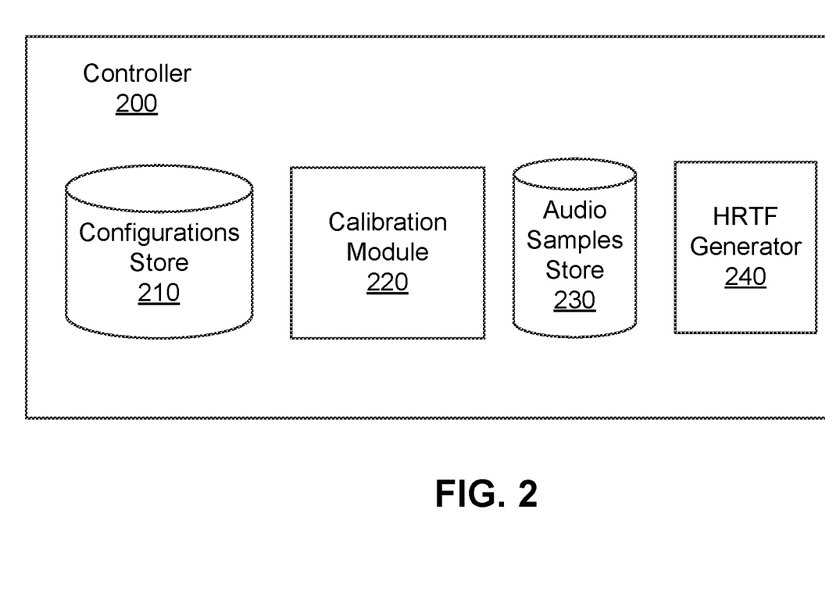
FIG. 2 is an example architectural block diagram of a controller for determining HRTFs using base stations, in accordance with an embodiment.

FIG. 2 is an example architectural block diagram of a controller 200, in accordance with an embodiment. The controller 200 may be used to determine HRTFs, for a user (e.g., the user 100), using one or more base stations (e.g., the base stations 110a, 110b). The controller 200 includes a configurations store 210, a calibration instructions generator 220, an audio samples store 230, and an HRTF generator 240.

The configurations store 210 stores a set of configurations of the base stations (e.g., 110a, 110b) for determining HRTFs. The configurations store 210 may be organized as a database, table, file, etc., stored on one or more of removable or non-removable memory cards and computer hard drives and may be located on a base station (e.g., 110*a*), within a console, on the HMD 150, or within the controller 200.

The controller 200 populates the set of configurations stored in the configurations store 210. Each configuration describes an arrangement of base stations (e.g., 110*a*, 110*b*) used to generate HRTFs based on a position of an HMD (e.g., HMD 150) in a calibration mode. Each configuration comprises a location of at least one base station (e.g., 110*a*) used to generate an HRTF. The location of a base station (e.g., 110*a*) in a configuration may be expressed as geometric co-ordinates in a room (e.g., room 120). In one embodiment, the controller 200 may use radio waves, magnetic fields, acoustic signals, other sensory information, or some combination thereof to determine the locations of the base stations (e.g., 110*a*, 110*b*). In one example, distance measurement to nearby base stations, magnetic positioning, dead reckoning, or some combination thereof may be used. In other examples, active location of base station tags, ambient location or environmental context, various optical, radio, acoustic technologies, or some combination thereof may be used.

Each configuration of base stations (e.g., 110*a*, 110*b*) may also indicate which base stations are to emit the test sounds, the frequency of the test sound emitted by a base station, the amplitude of the test sound emitted by a base station, the duration of the test sound emitted by a base station, etc. The set of base stations that are to emit test sounds, frequencies of test sounds, amplitude of test sounds, and duration of test sounds may be programmed manually, generated by a computer program using pre-programmed settings determined from experimental results, selected to mimic the audio content of the presentation mode, generated in some other manner to cover a range of possible configurations, or generated by a combination of such methods.

An example configuration may be represented as: (base station 110*a*, speaker 130*a*, location 2.3'X 7.2'Y, frequency 5 kHz, amplitude 17 dB, duration 0.1 seconds; base station 110*b*, speaker 130*b*, OFF). In this example, only speaker 130*a* is active. Another example configuration may be represented as: (base station 110*a*, speaker 130*a*, location 1.4'X 5.1'Y, frequency 4 kHz, amplitude 16 dB, duration 0.2 seconds; base station 110*b*, speaker 130*b*, location 5.4'X 1.1'Y, frequency 6 kHz, amplitude 18 dB, duration 0.3 seconds). In this example, both speakers 130*a*, 130*b* are active.

The calibration module 220 instructs a speaker (e.g., 130*a*) of at least one base station (e.g., 110*a*) to emit a test sound to obtain audio samples from the microphone 185. The calibration module 220 generates calibration instructions for the speakers (e.g., 130*a*, 130*b*) based on the determined relative position of the HMD 150 and the configuration being executed. In one aspect, the calibration module 220 may generate calibration instructions for the speakers based on whether the HMD 150 is aligned respective to a particular set of base stations (e.g., 110*a*, 110*b*) or aligned respective to a coordinate of the artificial reality space. In another aspect, this manner, the calibration module 220 the calibration module 220 may generate calibration instructions based on positions of the user's ears and relative positions between the speakers and both ears. In another aspect, the calibration module 220 may form a data set of different relative positions of the HMD 150. The generated instructions cause one or more of the speakers to emit test sounds at specific positions of the HMD 150 to fill out the data set. In one mode, the user (e.g., user 100) may be prompted to look at or move to different points or directions in the artificial reality space to fill out the data set (described above as the static calibration mode). In another mode, the calibration module 220 may generate the calibration instructions for the speakers (e.g., 130*a*, 130*b*) dynamically as the user (e.g., 100) is experiencing the artificial reality environment (described above as the dynamic calibration mode).

The calibration instructions contain instructions for the speakers to emit specific test sounds based on specific positions of the HMD 150. The calibration instructions may be generated to minimize the influence of early reflections and reverberation on the measured response. The calibration instructions may be generated to measure HRTFs at small increments of θ such as 15° or 30° in the horizontal plane, with interpolation used to synthesize HRTFs for arbitrary positions of θ. For example, a set of calibration instructions may be expressed as: (base station 110*a*, speaker 130*a*, location 1.4'X 5.1'Y, frequency 4 kHz, amplitude 16 dB, duration 0.2 seconds; base station 110*b*, speaker 130*b*, location 5.4'X 1.1'Y, frequency 6 kHz, amplitude 18 dB, duration 0.3 seconds; HMD 150, location 0.4'X 1.1'Y 2.4'Z). By instructing different sets of N base stations to emit test sounds when the HMD 150 is at M different coordinates, the calibration module 220 can create M×2N or more audio samples for each ear, and perform interpolation to obtain additional HRTFs.

The audio samples store 230 stores the audio samples generated by the microphones (e.g., 160) from the test sounds emitted by the speakers (e.g., 130*a*, 130*b*). The audio samples store 208 may be organized as a database, table, file, etc., stored on one or more of removable or non-removable memory cards and computer hard drives.

The HRTF generator 240 determines the HRTFs based in part on the audio samples for the set of configurations in the configurations store 210. The HRTF generator 240 may determine an HRTF by measuring the head-related impulse response (HRIR) of audio samples at microphones (e.g., 160) based on the test sounds emitted by the speakers (e.g., 130*a*, 130*b*). The HRTF may then be determined as the Fourier transform of the HRIR. Moreover, the HRTF generator 240 obtains, based on the plurality of HRTFs, an audio characterization configuration that can be used by the VR engine 155 for generating sounds (e.g., stereo sounds or surround sounds) when executing one or more applications in an application store. In one embodiment, the HRTF generator 240 is implemented in hardware, software, firmware, or a combination thereof.

In one embodiment, the HRTF generator 240 obtains the audio characterization configuration based on raw HRTFs using loudspeaker transfer function (LTF) and a headphone transfer function (HTF). Specifically, once the raw set of HRTFs is recorded, the speaker (e.g., 130*a*) used for recording and speakers (e.g., headphones embedded in the HMD 150) used for playback characteristics are taken into account by multiplying the raw HRTFs by the LTF, and by dividing the multiplied HRTFs by the HTF, both are known in advance and are the same for all users. The set of corrected HRTFs is used to simulate a 3D sound via corresponding functions incorporated into standard audio libraries, e.g., OpenAL. To simulate a sound coming from a given direction this sound can be filtered (or convoluted) with audio characterization configuration. In one embodiment, the audio characterization configuration can be implemented as an HRIR filter. The filter can be obtained by performing interpolation on a corrected set of HRTFs based on LTF and HTF according to the azimuth φ and elevation θ angles of a sound source to derive new HRTF corresponding to the location of the sound source, and by performing Fourier transformation on the new HRTF to obtain the HRIR filter.

To create a virtual auditory space, the acoustical waveforms present at the user's ear canals should be substantially the same under headphones as when the sounds are emitted from points in the virtual space, such that the user's experience in the virtual space is also substantially the same. In the virtual auditory space, the headphones should be able to "externalize" the sound to mimic gaming or other virtual environments. In one embodiment, the HRTF generator 240 may therefore determine the HRTFs to spatially position virtual sounds as follows. The HRTF generator 240 generates a first transfer function based on audio samples generated by microphones (e.g., 160) coupled to the HMD 150. The HRTF generator 240 generates a second transfer function $H2(f)$ based on audio samples generated by microphones (e.g., 160) coupled to the HMD 150 worn by a user (e.g., 100). The HRTF generator 240 computes the HRTF $H(f)$ as a difference between the first transfer function $H1(f)$ and the second transfer function $H2(f)$ to remove the effects of the HMD 150. The HRTF is therefore generated to improve the user's experience in the virtual space as if the user were not wearing the HMD.

In another embodiment, suppose signal $s1(t)$ represents a test sound from a speaker (e.g., 130a) and signal $a1(t)$ represents the audio sample received by a microphone (e.g., 160) in the user's ear canal. Suppose signal $s2(t)$ represents the sound from a headphone and signal $a2(t)$ represents the microphone's response to the headphone sound. The HRTF generator 240 computes the HRTF $H(f)$ for signal $s2(t)$ such that $a2(t)=a1(t)$. The HRTF is therefore generated to improve the user's experience in the virtual space such that the user (e.g., 100) experiences the sound as if it is emitted from a particular location in the virtual space and not from the headphones.

System Environment Using Multiple Configurations for Determining HRTFs

Figure 3:
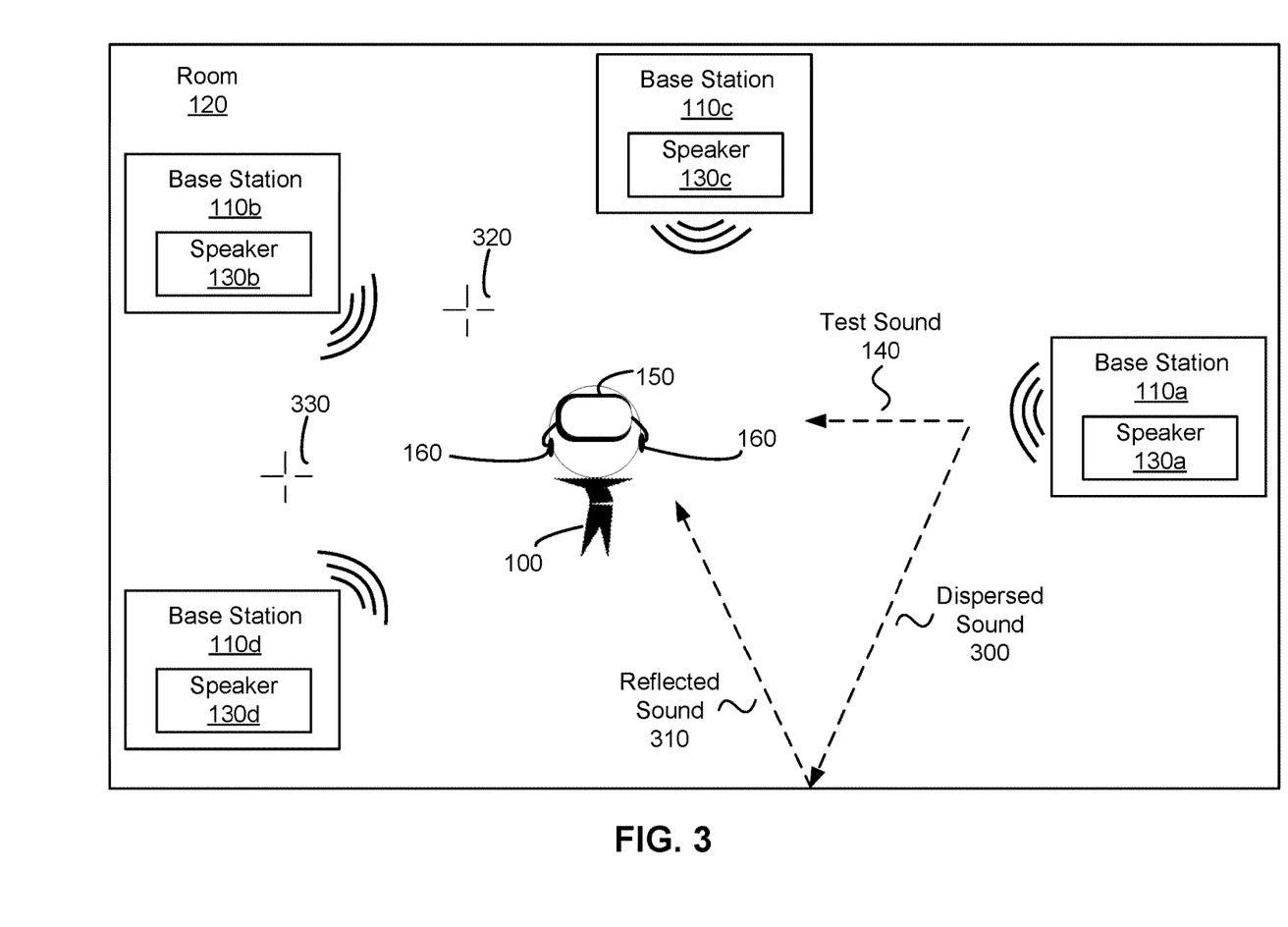
FIG. 3 is an example view of a system environment using multiple configurations for determining HRTFs, in accordance with an embodiment.

FIG. 3 is an example view of a system environment using multiple configurations for determining HRTFs, in accordance with an embodiment. In FIG. 3, the user 100 is shown in the room 120. There are four base stations 110a, 110b, 110c, and 110d. Each base station (e.g., 110a) is located at a distinct location within the local area (room 120); each location may be expressed in the form of coordinates as described above with respect to FIG. 2. Each base station includes a speaker (e.g., 130a, 130b, 130c, or 130d) configured to emit a test sound (e.g., speaker 130a emits test sound 140) in accordance with calibration instructions as described above with reference to FIG. 2.

The duration of each test sound (e.g., test sound 140) may be varied across configurations (as described above with reference to FIG. 2) to prevent test sound reflections from interfering with the HRTF measurement. For example, test sound 140 emitted by speaker 130a may travel in the direction of the user 100 while dispersed sound 300 also emitted by speaker 130a may travel towards a wall of the room 120 and reflect towards the user 100 as reflected sound 316. The user's auditory system generally analyses only the direct test sound 140 that arrives first for sound localization, but not the reflected sound 310 that arrives at the microphones 160 after the test sound 140. The time duration in which the direct test sound 140 prevails is used for directional and loudness evaluation. The reflected sound 310, which arrives later, can lead to unstable directional cues because there may be a mix of sounds of several reflection directions. Therefore, the sound capture may be "windowed" (captured for a short duration) such that the audio samples are based on only the direct test sound 140 before the reflected sound 310 reaches the microphones 160. A calibration module (e.g., 220) may instruct the user 100 to move to different locations (e.g., 320, 330) or the base stations may be located at different locations (e.g., 320, 330).

A user (e.g., 100) in a virtual environment may perceive a sound source that appears within the frontal hemisphere as if it were located in the rear hemisphere, and vice versa. This front-back error may occur because of the ambiguity in the cues of primary interaural differences, particularly in interaural time differences. The disclosed embodiments may reduce such errors by allowing the user to move her head during HRTF determination since the different measurements provide information to resolve the ambiguity. Moreover, the disclosed embodiments obviate the need for long measurement times, sound dampening chambers, speaker arrays, etc., thereby reducing the cost and complexity of HRTF determination.

Process for Determining HRTFs Using Base Stations

Figure 4:
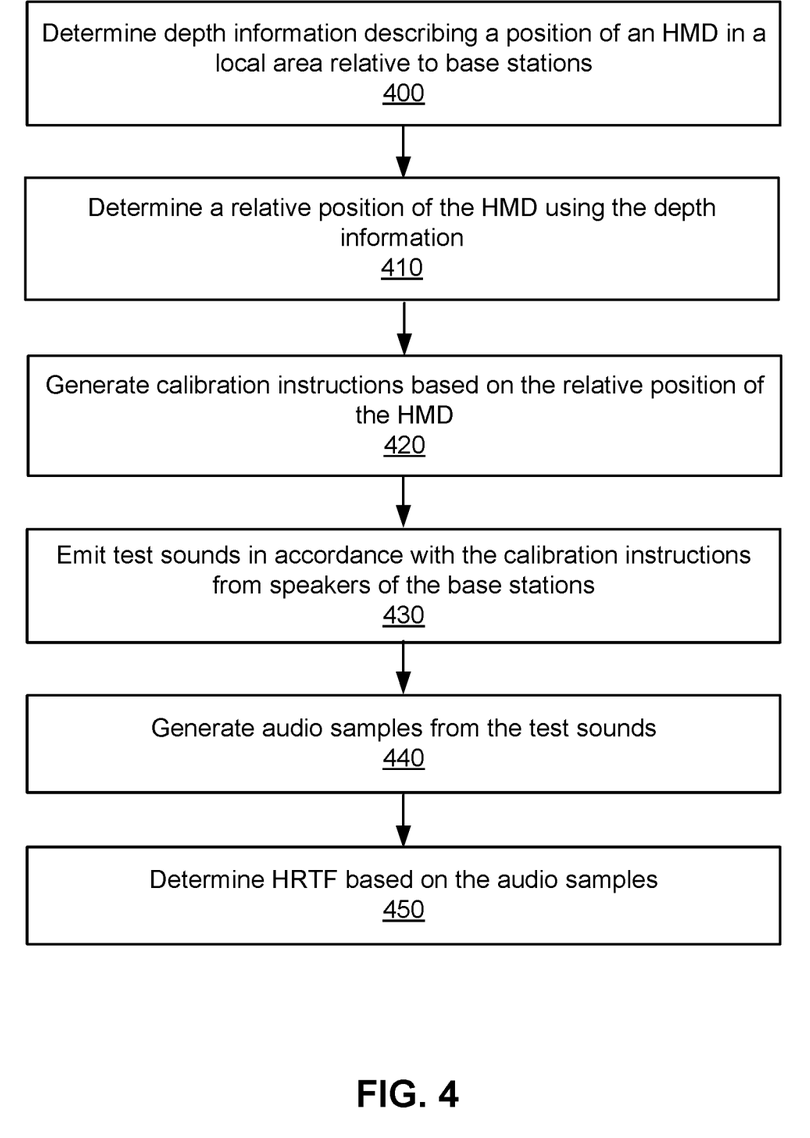
FIG. 4 is an example process for determining HRTFs using base stations, in accordance with an embodiment.

FIG. 4 is an example process for determining HRTFs for a user using base stations (e.g., 110a, 110b) in accordance with an embodiment. In one embodiment, the process of FIG. 4 is performed by a HMD system. The HMD system is described in detail below with reference to FIG. 5. Likewise, embodiments may include different and/or additional steps, or perform the steps in different orders.

The HMD system determines 400 depth information describing a position of an HMD (e.g., 150) in a local area. The HMD system may use, e.g., a depth camera assembly to determine the depth information. A depth camera assembly may be part of a base station (e.g., 110a). The depth camera assembly may illuminate the HMD 150 with structured light. The depth camera assembly captures images of the HMD 150 illuminated with the structured light and uses the captured images to determine a location of the HMD 150. In some embodiments, a plurality of base stations (e.g., 110a, 110b) and/or the HMD 150 each include a depth camera assembly and information from each of the depth camera assemblies is used to determine the depth information that describes the position of the HMD 150.

The HMD system determines 410 the relative position of the HMD 150 using the depth information. The relative position of the HMD 150 is determined relative to base stations (e.g., 110a, 110b) in the local area. In one aspect, a controller (e.g., the controller 200 or a depth camera controller) may create a depth map that contains information relating to the distance of the surfaces of target objects (HMD 150 and base stations) from a particular viewpoint. The controller may use the information in the depth map to determine the shape of the surfaces and the distances to the surfaces. The controller may use these distances to determine the relative position of the HMD 150.

The HMD system generates 420 calibration instructions based on the relative position of the HMD 150. For each configuration of the base stations (e.g., 110a, 110b), the calibration instructions instruct a speaker of at least one base station (e.g., 110a) to emit a test sound (e.g., 140). The calibration instructions may also contain information related to the frequencies and durations of the test sounds to be emitted.

The HMD system emits 430 test sounds in accordance with the calibration instructions. The test sounds may be emitted by speakers (e.g., 130a, 130b, 130c) of one or more of the base stations (e.g., 110a, 110b). For example, the calibration instructions may instruct speakers 130a and 130c to emit test sounds (e.g., 140), while instructing speaker 130b to remain silent.

The HMD system generates 440 respective audio samples from the test sounds (e.g., 140). The respective audio samples may be generated by microphones (e.g., 160), which are configured to be placed in ear canals of a user (e.g., 100) wearing the HMD 150. The audio samples are electronic representations (either in an analog format, digital format, or some combination thereof) of the received test sound 140.

The HMD system determines 450 an HRTF based on the audio samples. The HRTF may be determined by a controller (e.g., 200), which determines a first transfer function based on audio samples generated by the microphones 160 coupled to the HMD 150. The controller 200 may determine a second transfer function based on audio samples generated by the microphones 160 coupled to the HMD 150 worn by the user 100. The controller may compute the HRTF as a difference between the first transfer function and the second transfer function. The controller 200 determines whether there is an additional configuration to test. If there is an additional configuration to test, the controller selects the next configuration from a configuration store (e.g., 210). If there is no additional configuration to test, the controller 200 may determine an audio characterization configuration based on the HRTFs. The audio characterization configuration is a function to synthesize a binaural sound that seems to come from a particular point in a virtual space. The controller 200 may synthesize the binaural sound based on the audio characterization configuration.

System Environment Including a Virtual Reality System

Figure 5:
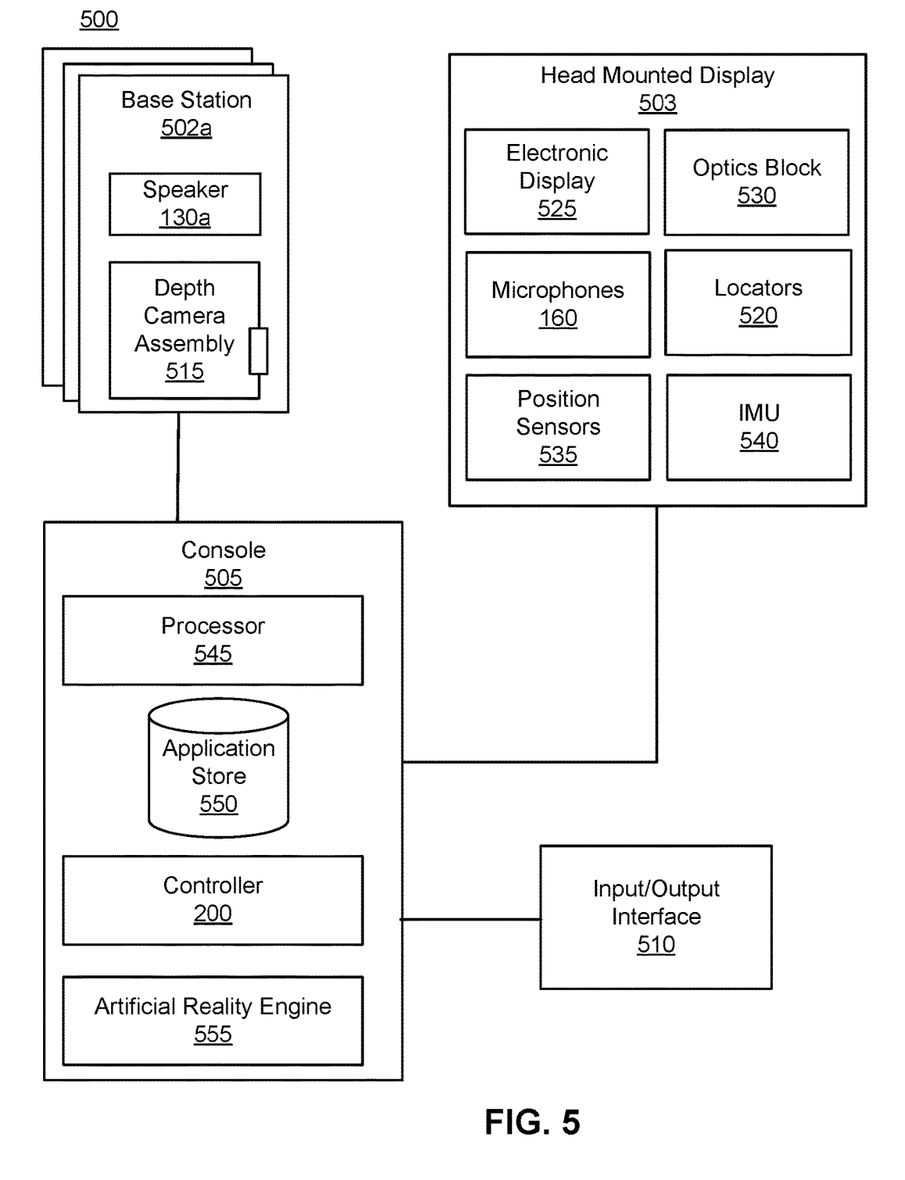
FIG. 5 is a block diagram of a system environment including an artificial reality system, in accordance with an embodiment.

FIG. 5 is a block diagram of a HMD system 500, in accordance with an embodiment. The HMD system 500 may be an artificial reality system. The HMD system 500 includes base stations (e.g., 502a), an HMD 503, a console 505, and an input/output (I/O) interface 510.

Each base station (e.g., 502a) is an embodiment of the base stations (e.g., 110a) described above with respect to FIG. 1. Each base station (e.g., 502a) is located at a distinct location within a local area and includes a speaker (e.g., 130a) configured to emit a test sound (e.g., 140) in accordance with calibration instructions. Each base station (e.g., 502a) may include a depth camera assembly 515 configured to determine depth information describing a position of the HMD 503 in the local area relative to the locations of the base stations (e.g., 502a). The depth camera assembly 515 may include a light projector or source configured to provide structured light in a direction of the HMD 503. The depth camera assembly 515 may include an imaging device configured to capture images of the HMD 503 and the other base stations. The depth camera assembly 515 may include a depth camera controller configured to determine the depth information using the captured images. In one embodiment, the depth camera assembly 515 may be part of the console 505 or a standalone light-and-camera system.

The light source may provide structured light in the form of a known pattern (e.g., dot patterns, grids, some other structured pattern, horizontal bars, or a combination thereof) on to the HMD 503 and base stations (e.g., 502a). The structured light deforms when striking the target surfaces to allow the depth camera controller to calculate the depth and surface information of the objects in the scene, and build a 3D map of the scene. In one embodiment, invisible (or imperceptible) structured light may be used without interfering with other computer vision tasks for which the projected pattern will be confusing. Example methods include the use of infrared light or of extremely high frame rates alternating between two exact opposite patterns.

Images of the HMD 503 and the base stations (e.g., 502a) may be obtained by projecting a narrow band of light onto the surfaces of the HMD 503 and base stations to produce a line of illumination that appears distorted from other perspectives than that of the light source. The images can be used for a geometric reconstruction of the surface shape by the depth camera controller. In one embodiment, many patterns may be projected, consisting of many stripes at once, or of arbitrary fringes, as this allows for the acquisition of a multitude of samples simultaneously. Seen from different viewpoints, the patterns may appear geometrically distorted due to the surface shape of the target objects. In one embodiment, patterns of parallel stripes may be used to obtain images depicting geometrical deformations of a single stripe projected onto the 3D surfaces. The displacement of the stripes allows for retrieval of the 3D coordinates of details on the target surfaces.

The imaging device may create a 3D model of geometric samples or points on the target surfaces of the HMD 503 and base stations. These points may then be used to extrapolate the shape of the surfaces. In this manner, the imaging device may collect distance information about surfaces within its field of view. The "image" produced may describe the distance to a surface at each point in the image. This allows the three dimensional position of each point in the image to be identified.

In some embodiments, the HMD 503 optionally includes one or more locators 520. The depth camera assembly 515 may generate images showing observed positions of the optional locators 520 (described in detail below) that are detectable by the depth camera assembly 515. The depth camera assembly 515 may include one or more cameras, one or more video cameras, any other device capable of capturing images including one or more of the locators 520, or some combination thereof. Additionally, the depth camera assembly 515 may include one or more filters (e.g., used to increase signal to noise ratio). The depth camera assembly 515 may be configured to detect light emitted or reflected from the locators 520 in a field of view of the depth camera assembly 515. In embodiments where the locators 520 include passive elements (e.g., a retroreflector), the depth camera assembly 515 may include a light source that illuminates some or all of the locators 520, which retro-reflect the light towards the light source in the depth camera assembly 515. The depth camera assembly 515 may receive one or more calibration parameters from the console 505 to adjust one or more imaging parameters (e.g., focal length, focus, frame rate, ISO, sensor temperature, shutter speed, aperture, etc.).

The depth camera controller may determine depth information describing a position of the HMD 503 in the local area relative to the locations of the base stations. In one embodiment, the depth camera controller creates a depth map that contains information relating to the distance of the surfaces of target objects (HMD 503 and base stations) from a particular viewpoint. For example, different depth maps may be created showing luminance in proportion to the distance from the imaging device (nearer surfaces are darker; further surfaces are lighter) or luminance in relation to the distances from a nominal focal plane (surfaces closer to the focal plane are darker; surfaces further from the focal plane are lighter). In addition, the depth camera controller may use image processing to make the rendering of 3D scenes more efficient. The image processing can be used to identify objects hidden from view and which may therefore be ignored for some rendering purposes. This is useful in real time applications such as computer games, where a fast succession of completed renders must be available in time to be displayed at a regular and fixed rate. The depth camera controller may use shadow mapping to create shadows cast by illumination in 3D computer graphics, in which the depth maps are calculated from the perspective of the lights, not the viewer. The depth camera controller may be located within the depth camera assembly, on the console 505, within the HMD 503, on a base station (e.g., 502a), or within the controller 200.

The HMD 503 is a head-mounted display that presents media to a user. The HMD 503 is an embodiment of the HMD 150 described above with reference to FIG. 1. Examples of media presented by the HMD 503 include one or more images, video, audio, or any combination thereof. The HMD 503 includes an electronic display 525, an optics block 530, one or more position sensors 535, microphones 160, and an inertial measurement unit (IMU) 540.

The electronic display 525 displays images to a user (e.g., 100) in accordance with data received from the console 505. The electronic display 525 displays two-dimensional or three-dimensional images to the user in accordance with data received from the console 505. In various embodiments, the electronic display 525 comprises a single electronic display or multiple electronic displays (e.g., a display for each eye of a user). Examples of the electronic display 1025 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optics block 530 magnifies received light from the electronic display 525, corrects optical errors associated with the image light, and the corrected image light is presented to a user of the HMD 503. An optical element may be an aperture, a Fresnel lens, a convex lens, a concave lens, a filter, or any other suitable optical element that affects the image light emitted from the electronic display 525. Moreover, the optics block 530 may include combinations of different optical elements. In some embodiments, one or more of the optical elements in the optics block 530 may have one or more coatings, such as anti-reflective coatings.

The locators 520 are objects located in specific positions on the HMD 503 relative to one another and relative to a specific reference point on the HMD 503. A locator 520 may be a light emitting diode (LED), a corner cube reflector, a reflective marker, a type of light source that contrasts with an environment in which the HMD 503 operates, or some combination thereof. In embodiments where the locators 520 are active (i.e., an LED or other type of light emitting device), the locators 520 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 520 are located beneath an outer surface of the HMD 503, which is transparent to the wavelengths of light emitted or reflected by the locators 520 or is thin enough not to substantially attenuate the wavelengths of light emitted or reflected by the locators 520. Additionally, in some embodiments, the outer surface or other portions of the HMD 503 are opaque in the visible band of wavelengths of light. Thus, the locators 520 may emit light in the IR band under an outer surface that is transparent in the IR band but opaque in the visible band.

The IMU 540 is an electronic device that generates IMU data based on measurement signals received from one or more of the position sensors 535. A position sensor 535 generates one or more measurement signals in response to motion of the HMD 503. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates IMU data indicating an estimated position of the HMD 503 relative to an initial position of the HMD 503. For example, the position sensors 535 include multiple accelerometers to measure translational motion (forward/back, up/down, left/right) and multiple gyroscopes to measure rotational motion (e.g., pitch, yaw, and roll). In some embodiments, the IMU 540 rapidly samples the measurement signals and calculates the estimated position of the HMD 503 from the sampled data. For example, the IMU 540 integrates the measurement signals received from the accelerometers over time to estimate a velocity vector and integrates the velocity vector over time to determine an estimated position of a reference point on the HMD 503. Alternatively, the IMU 540 provides the sampled measurement signals to the console 505, which determines the IMU data. The reference point is a point that may be used to describe the position of the HMD 503. While the reference point may generally be defined as a point in space; however, in practice the reference point is defined as a point within the HMD 503 (e.g., a center of the IMU 540).

The IMU 540 receives one or more calibration parameters from the console 505. As further discussed below, the one or more calibration parameters are used to maintain tracking of the HMD 503. Based on a received calibration parameter, the IMU 540 may adjust one or more IMU parameters (e.g., sample rate). In some embodiments, certain calibration parameters cause the IMU 540 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The console 505 provides media to the HMD 503 for presentation to the user in accordance with information received from one or more of: the depth camera assembly 515, the HMD 503, the I/O interface 510, and the microphones 160. The console 505 may instruct the speakers (e.g., 130a) to transmit sounds either for performing HRTF calibrations in the calibration mode or for providing audible feedback as part of presenting artificial reality in the presentation mode. The console 505 may receive sounds detected at the microphones 160 to perform HRTF calibration. In the example shown in FIG. 5, the console 505 includes a processor 545, an application store 550, a controller 200, and an artificial reality engine 555. The various components of the console 505 shown in FIG. 5 may contain computer-readable media storing instructions that are executed by the processor 545. Some embodiments of the console 505 have different modules than those described in conjunction with FIG. 5. Similarly, the functions described herein may be distributed among components of the console 505 in a different manner than is described here.

The application store 550 stores one or more applications for execution by the console 505. An application is a group of instructions, that when executed by the processor 545, generates content for presentation to the user 100. Content generated by an application may be in response to inputs received from the user via movement of the HMD 503 or the I/O interface 510. Examples of applications include: gaming applications, conferencing applications, video playback application, or other suitable applications.

The controller 200 calibrates the artificial reality system environment 500 using one or more calibration parameters and may adjust one or more calibration parameters to reduce error in determination of the position of the HMD 503. For example, the controller 200 may adjust the focus of an imaging device within the depth camera assembly 515 to obtain a more accurate position for observed locators 120 on the HMD 503. Moreover, calibration performed by the controller 200 may also account for information received from the IMU 540. Additionally, if tracking of the HMD 503 is lost (e.g., the imaging device loses line of sight of at least a threshold number of the locators 520), the controller 200 may re-calibrate some or all of the system environment 500. In one embodiment, the controller 200 is implemented in hardware, software, firmware, or a combination thereof.

The controller 200 performs calibration of HRTFs in a calibration mode. In one aspect, the controller 200 operates the speakers (e.g., 130a) and the HMD 503 to perform HRTF calibration. In one approach, the controller 200 prompts a user (e.g., 100) to move to different locations in the room (e.g., 120) or turn his/her head at a specific direction through the HMD 503. Responsive to determining that the orientation of the user's head is at a desired location or direction, the controller 200 instructs the speakers (e.g., 130a) to transmit a test sound (e.g., 140) to the user 100. In some embodiments, the controller 200 generates test sounds at different frequencies to obtain various audio samples. The controller 200 obtains audio samples generated by the microphones 160 based on the transmitted test sound 140, and obtains HRTFs based on the audio samples.

The controller 200 determines HRTFs based on the audio samples, then determines an audio characterization configuration based on the HRTFs. The audio characterization configuration is a function which the console 505 uses in conjunction with the HMD 503 to synthesize a binaural sound that seems to come from a particular point in space. The console 505 may, e.g., fit an interpolating function to the HRTFs (e.g., a set of spherical harmonics), such that any given direction in space maps to an HRTF. Alternatively, the console 505 may generate a lookup table that maps different directions in space to the closest HRTFs. The audio characterization configuration can be used by the artificial reality engine 555 for presenting sound (e.g., surround sound), when executing one or more applications in the application store 550 in the presentation mode.

The artificial reality engine 555 executes applications within the system environment 500 and receives position information, acceleration information, velocity information, predicted future positions, or some combination thereof of the HMD 503 from the controller 200. Based on the received information, the artificial reality engine 555 determines content to provide to the HMD 503 for presentation to the user. For example, if the received information indicates that the user has looked to the left, the artificial reality engine 555 may generate content for the HMD 503 that mirrors the user's movement in a virtual environment. Additionally, the artificial reality engine 555 performs an action within an application executing on the console 505 in response to an action request received from the I/O interface 510 and provides feedback to the user that the action was performed. In one example, the artificial reality engine 555 instructs the HMD 503 to provide visual or audible feedback to the user. In one example, the artificial reality engine 555 causes one or more speakers to provide audible feedback (e.g., stereo sound or surround sound) to the user 100 based on the audio characterization configuration. In one embodiment, the artificial reality engine 555 is implemented in hardware, software, firmware, or a combination thereof.

The I/O interface 510 is a device that allows a user to send action requests to the console 505. An action request is a request to perform a particular action. For example, an action request may be to start or end an application or to perform a particular action within the application. The I/O interface 510 may include one or more input devices. Example input devices include: a keyboard, a mouse, a game controller, or any other suitable device for receiving action requests and communicating the received action requests to the console 505. An action request received by the I/O interface 510 is communicated to the console 505, which performs an action corresponding to the action request. In some embodiments, the I/O interface 510 may provide sounds to the user in accordance with instructions received from the console 505. For example, sounds are provided when an action request is received, or the console 505 communicates instructions to the I/O interface 510 causing it to generate sounds when the console 505 performs an action.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   a plurality of base stations, each base station located at a respective distinct static location within a local area and including a speaker configured to emit a test sound in accordance with calibration instructions;
   a depth camera assembly configured to determine depth information describing a position of a head-mounted display (HMD) in the local area relative to the locations of the plurality of base stations;
   a microphone configured to:
      be placed in an ear canal of a user wearing the HMD, and
      generate a respective audio sample from the test sound emitted by the speaker of each base station; and
   a controller configured to:
      determine the relative position of the HMD using the depth information;
      generate the calibration instructions based on the relative position of the HMD; and
      determine a head related transfer function (HRTF) based on the audio samples.

2. The system of claim 1, wherein the microphone is coupled to the HMD.

3. The system of claim 1, wherein the depth camera assembly comprises:
   a light projector configured to provide structured light in a direction of the HMD;
   an imaging device configured to capture images of the HMD and the plurality of base stations; and
   a depth camera controller configured to determine the depth information using the captured images.

4. The system of claim 1, wherein the determining of the HRTF comprises steps to:
   determine a first transfer function based on audio samples generated by the microphone coupled to the HMD;
   determine a second transfer function based on audio samples generated by the microphone coupled to the HMD worn by the user; and
   compute the HRTF as a difference between the first transfer function and the second transfer function.

5. The system of claim 1, wherein the test sounds comprise one or more logarithmic chirps.

6. The system of claim 1, wherein the controller is further configured to:
   populate a set of configurations, each configuration comprising the location of at least one base station;
   for each configuration, instruct the speaker of the at least one base station to emit the test sound to obtain the audio samples from the microphone for the configuration; and
   determine HRTFs based on the audio samples for the set of configurations.

7. The system of claim 6, wherein the controller is further configured to:
   determine an audio characterization configuration based on the HRTFs, the audio characterization configuration being a function to synthesize a binaural sound that seems to come from a particular point in a virtual space; and
   synthesizing the binaural sound based on the audio characterization configuration.

8. A head-mounted display (HMD) comprising:
   a microphone configured to:
      be placed in an ear canal of a user wearing the HMD, and
      generate respective audio samples from test sounds received from a plurality of base stations, each base station located at a respective distinct static location within a local area and including a speaker configured to emit a test sound in accordance with calibration instructions; and
   a controller configured to:
      determine depth information describing a position of the HMD in the local area relative to the locations of the plurality of base stations using images captured by a depth camera assembly,
      determine the position of the HMD using the depth information,
      generate the calibration instructions based on the relative position of the HMD, and
      determine a head-related transfer function (HRTF) based on the audio samples.

9. The HMD of claim 8, wherein the depth camera assembly comprises:
   a light projector configured to provide structured light in a direction of the HMD; and
   an imaging device configured to capture the images of the HMD and the plurality of base stations.

10. The HMD of claim 8, wherein the determining of the HRTF comprises steps to:
    determine a first transfer function based on audio samples generated by the microphone;
    determine a second transfer function based on audio samples generated by the microphone worn by the user; and
    compute the HRTF as a difference between the first transfer function and the second transfer function.

11. The HMD of claim 8, wherein the test sounds comprise one or more logarithmic chirps.

12. The HMD of claim 8, wherein the controller is further configured to:
    populate a set of configurations, each configuration comprising the location of at least one base station;
    for each configuration, instruct the speaker of the at least one base station to emit the test sound to obtain the audio samples from the microphone for the configuration; and
    determine HRTFs based on the audio samples for the set of configurations.

13. The HMD of claim 12, wherein the controller is further configured to:
    determine an audio characterization configuration based on the HRTFs, the audio characterization configuration being a function to synthesize a binaural sound that seems to come from a particular point in a virtual space; and synthesizing the binaural sound based on the audio characterization configuration.

14. A method comprising:

determining depth information describing a position of a head-mounted display (HMD) in a local area relative to a plurality of base stations, each base station located at a respective distinct static location within the local area;

determining the relative position of the HMD using the depth information;

generating calibration instructions based on the relative position of the HMD;

emitting test sounds in accordance with the calibration instructions from speakers of the plurality of base stations;

generating, by a microphone configured to be placed in an ear canal of a user wearing the HMD, respective audio samples from the test sounds emitted by the speakers;

determining a head-related transfer function (HRTF) based on the audio samples.

15. The method of claim 14, wherein the microphone is coupled to the HMD.

16. The method of claim 14, wherein the determining of the depth information comprises:

illuminating, by a light projector, the HMD with structured light, wherein the light projector is coupled to a first base station of the plurality of base stations;

capturing, by an imaging device, images of the HMD, wherein the imaging device is coupled to the first base station; and determining the depth information based in part on the captured images.

17. The method of claim 14, wherein the determining of the HRTF comprises:

determining a first transfer function based on audio samples generated by the microphone coupled to the HMD;

determining a second transfer function based on audio samples generated by the microphone coupled to the HMD worn by the user; and computing the HRTF as a difference between the first transfer function and the second transfer function.

18. The method of claim 14, wherein the test sounds comprise one or more logarithmic chirps.

19. The method of claim 14, further comprising:

populating a set of configurations, each configuration comprising the location of at least one base station;

for each configuration, instructing the speaker of the at least one base station to emit the test sound to obtain the audio samples from the microphone for the configuration; and determining HRTFs based on the audio samples for the set of configurations.

20. The method of claim 19, further comprising:

determining an audio characterization configuration based on the HRTFs, the audio characterization configuration being a function to synthesize a binaural sound that seems to come from a particular point in a virtual space; and synthesizing the binaural sound based on the audio characterization configuration.

21. The system of claim 1, wherein the plurality of base stations includes a first base station and a second base station, and a speaker of the first base station and a speaker of the second base station are configured to emit at least one test sound simultaneously.

* * * * *